United States Patent
Hoshino

(10) Patent No.: US 11,780,290 B2
(45) Date of Patent: Oct. 10, 2023

(54) VEHICLE AIR CONDITIONING DEVICE

(71) Applicant: TOYOTA JIDOSHA KABUSHIKI KAISHA, Toyota (JP)

(72) Inventor: Yu Hoshino, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 43 days.

(21) Appl. No.: 17/705,563

(22) Filed: Mar. 28, 2022

(65) Prior Publication Data

US 2022/0410660 A1     Dec. 29, 2022

(30) Foreign Application Priority Data

Jun. 23, 2021   (JP) .................. 2021-103949

(51) Int. Cl.
*B60H 1/00*    (2006.01)
*B60H 1/32*    (2006.01)

(52) U.S. Cl.
CPC ....... *B60H 1/00878* (2013.01); *B60H 1/3227* (2013.01); *B60H 2001/3263* (2013.01)

(58) Field of Classification Search
CPC .... B60H 1/00878; B60H 1/3227; B60H 1/02; B60H 1/04; B60H 1/06; B60H 1/3205; B60H 2001/3263
See application file for complete search history.

(56) References Cited

U.S. PATENT DOCUMENTS

2015/0298522 A1* 10/2015 Hirabayashi .......... F02D 41/068
                                                                      903/903
2022/0316732 A1* 10/2022 Son ......................... F24F 11/30

FOREIGN PATENT DOCUMENTS

JP          2010-169055 A       8/2010

* cited by examiner

*Primary Examiner* — Marc E Norman
(74) *Attorney, Agent, or Firm* — Dinsmore & Shohl LLP

(57) ABSTRACT

When a temperature of a coolant is a first predetermined temperature or higher, an air conditioner ECU executes a first control that sets a target evaporation temperature higher by a predetermined temperature and the air conditioner ECU executes a second control that changes the target evaporation temperature in accordance with a cooling load inside the vehicle cabin. When the second control is executed after the first control is executed, the air conditioner ECU sets a first target evaporation temperature set by the first control as the target evaporation temperature, and calculates a second target evaporation temperature that is changed by the second control based on the target evaporation temperature immediately before the first control is executed. When the second target evaporation temperature becomes larger than the first target evaporation temperature, the air conditioner ECU sets the second target evaporation temperature as the target evaporation temperature.

2 Claims, 5 Drawing Sheets

VEHICLE AIR CONDITIONING DEVICE

CROSS-REFERENCE TO RELATED APPLICATION

This application claims priority to Japanese Patent Application No. 2021-103949 filed on Jun. 23, 2021, incorporated herein by reference in its entirety.

BACKGROUND

1. Technical Field

The present disclosure relates to a vehicle air conditioning device having a condenser provided on an upstream side of a ventilation path of a radiator that dissipates heat of a coolant of a vehicle to be cooled.

2. Description of Related Art

The vehicle air conditioning device is a device that conditions air inside the vehicle, and has a vapor compression refrigeration cycle composed of a compressor, a condenser, an expansion valve, and an evaporator. The condenser dissipates heat by condensing a refrigerant and is provided on the upstream side of a ventilation path of a radiator that dissipates heat of a coolant of an engine, for example. The evaporator absorbs heat by evaporating the refrigerant and cools the air supplied to the passenger compartment.

The vehicle air conditioning device has a control unit that sets a target of an evaporation temperature (hereinafter referred to as a target evaporation temperature) for evaporating the refrigerant in the evaporator. The control unit has a first control that raises the target evaporation temperature by a predetermined temperature, and a second control that changes the target evaporation temperature in accordance with the air conditioning load in the vehicle cabin, when the temperature of the coolant of the engine is equal to or higher than the predetermined temperature (for example, Japanese Unexamined Patent Application Publication No. 2010-169055 (JP 2010-169055 A)).

In the first control described above, by raising the target evaporation temperature, the output of the compressor is reduced and the cooling capacity in the vehicle cabin is reduced. However, since the condenser load is reduced, the heat dissipation capacity of the radiator is improved, and deterioration of the driving performance is suppressed.

SUMMARY

However, in the vehicle air conditioning device described above, for example, when the occupant raises the set temperature in the vehicle cabin after the target evaporation temperature is raised and set by the first control, the target evaporation temperature is further raised and set. As a result, the cooling capacity in the vehicle cabin may be further reduced, and the comfortability in the vehicle cabin may be impaired.

Thus, an object of the present disclosure is to provide a vehicle air conditioning device that suppress a cooling capacity in a vehicle cabin from decreasing when a control for raising a target evaporation temperature is continuously executed.

The vehicle air conditioning device according to the present disclosure is a vehicle air conditioning device including a condenser provided on an upstream side of a ventilation path of a radiator that dissipates heat of a coolant of an object to be cooled of a vehicle and an evaporator that cools air supplied inside a vehicle cabin, the vehicle air conditioning device including a control unit that sets a target evaporation temperature at which a refrigerant is evaporated in the evaporator, in which when a temperature of the coolant is equal to or higher than a first predetermined temperature, the control unit executes a first control that sets the target evaporation temperature higher by a predetermined temperature and the control unit executes a second control that changes the target evaporation temperature in accordance with a cooling load inside the vehicle cabin, and when the second control is executed after the first control is executed, a first target evaporation temperature set by the first control is set as the target evaporation temperature, and a second target evaporation temperature is calculated in which the second target evaporation temperature is changed by the second control based on the target evaporation temperature immediately before the first control is executed, and when the second target evaporation temperature becomes larger than the first target evaporation temperature, the second target evaporation temperature is set as the target evaporation temperature.

In some embodiments of the vehicle air conditioning device according to the present disclosure, when the second control is executed after the first control is executed, and when the temperature of the coolant becomes equal to or less than a second predetermined temperature, the second target evaporation temperature may be set as the target evaporation temperature.

According to the vehicle air conditioning device of the present disclosure, it is possible to suppress the cooling capacity of the vehicle cabin from decreasing when the control for increasing the target evaporation temperature is continuously executed. As a result, the comfort inside the vehicle cabin is not impaired.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, an example of the embodiment of the present disclosure will be described in detail. In the following description, specific shapes, materials, directions, numerical values, and the like are examples for facilitating the understanding of the present disclosure, and can be appropriately changed according to applications, purposes, specifications, and the like.

A vehicle 5 according to the embodiment will be described with reference to FIG. 1.

Figure 1:
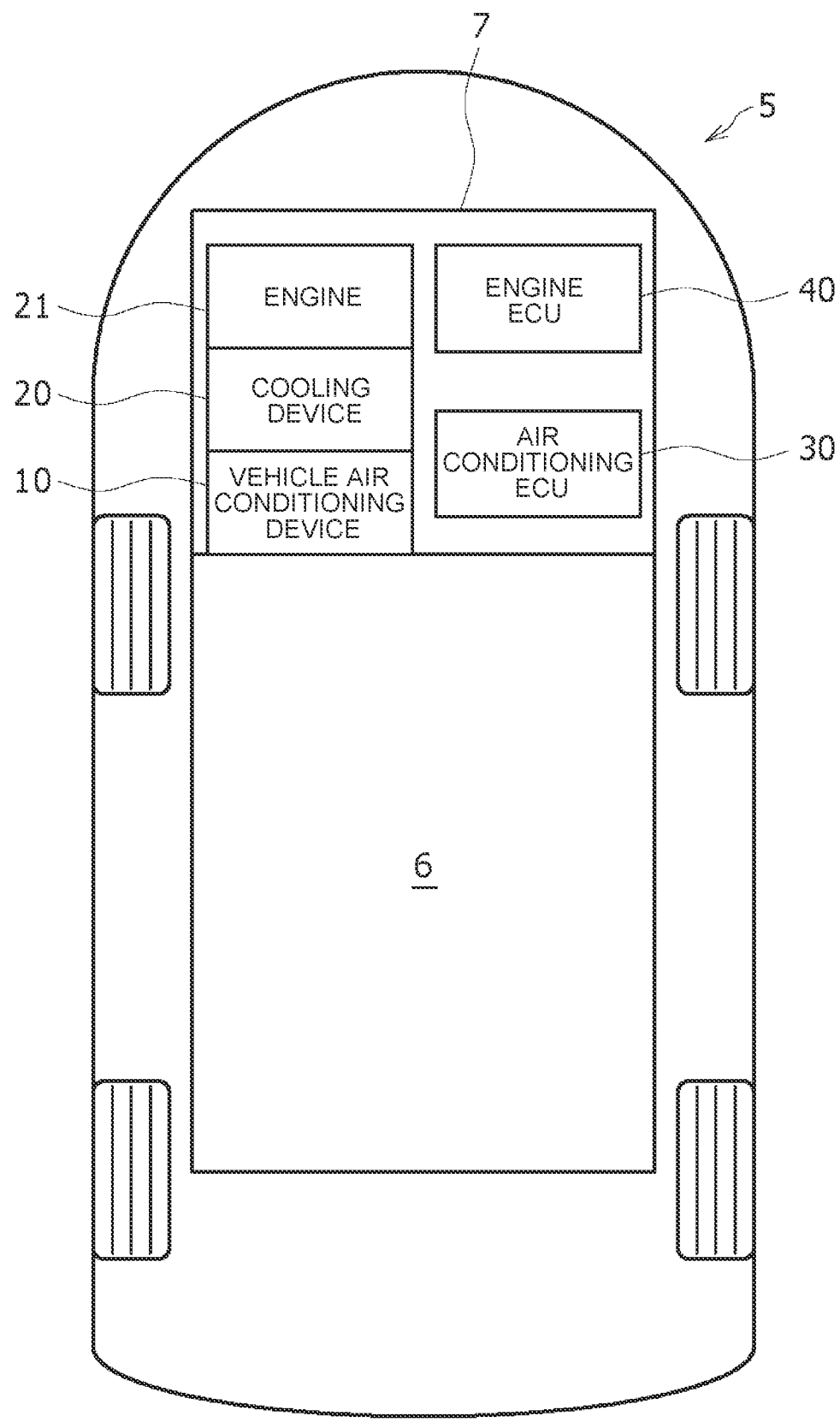
FIG. 1 is a schematic diagram showing a vehicle according to an embodiment.

As shown in FIG. 1, the vehicle 5 is provided with a vehicle air conditioning device 10 according to the present disclosure. The vehicle air conditioning device 10 is a device that conditions the air in a vehicle cabin 6 of the vehicle 5. The vehicle 5 is an engine vehicle that travels by using an engine 21 as a power source.

In this example, the vehicle 5 is an engine vehicle. However, the vehicle 5 is not limited to this. For example, the vehicle 5 may be an electric vehicle that runs on the power of a battery and that is driven by a motor. Further, the fuel cell electric vehicle may be a fuel cell electric vehicle that travels by using a motor as a power source by electric power generated by a chemical reaction between hydrogen and oxygen by a fuel cell.

The vehicle 5 includes the above-mentioned vehicle air conditioning device 10, a cooling device 20 that cools an engine 21 by circulating a coolant, an air conditioner electronic control unit (ECU) 30 serving as a control unit that controls the vehicle air conditioning device 10, and an engine ECU 40 that controls the engine 21.

The vehicle air conditioning device 10 that is an example of the embodiment and the cooling device 20 will be described with reference to FIGS. 2 and 3.

Figure 2:
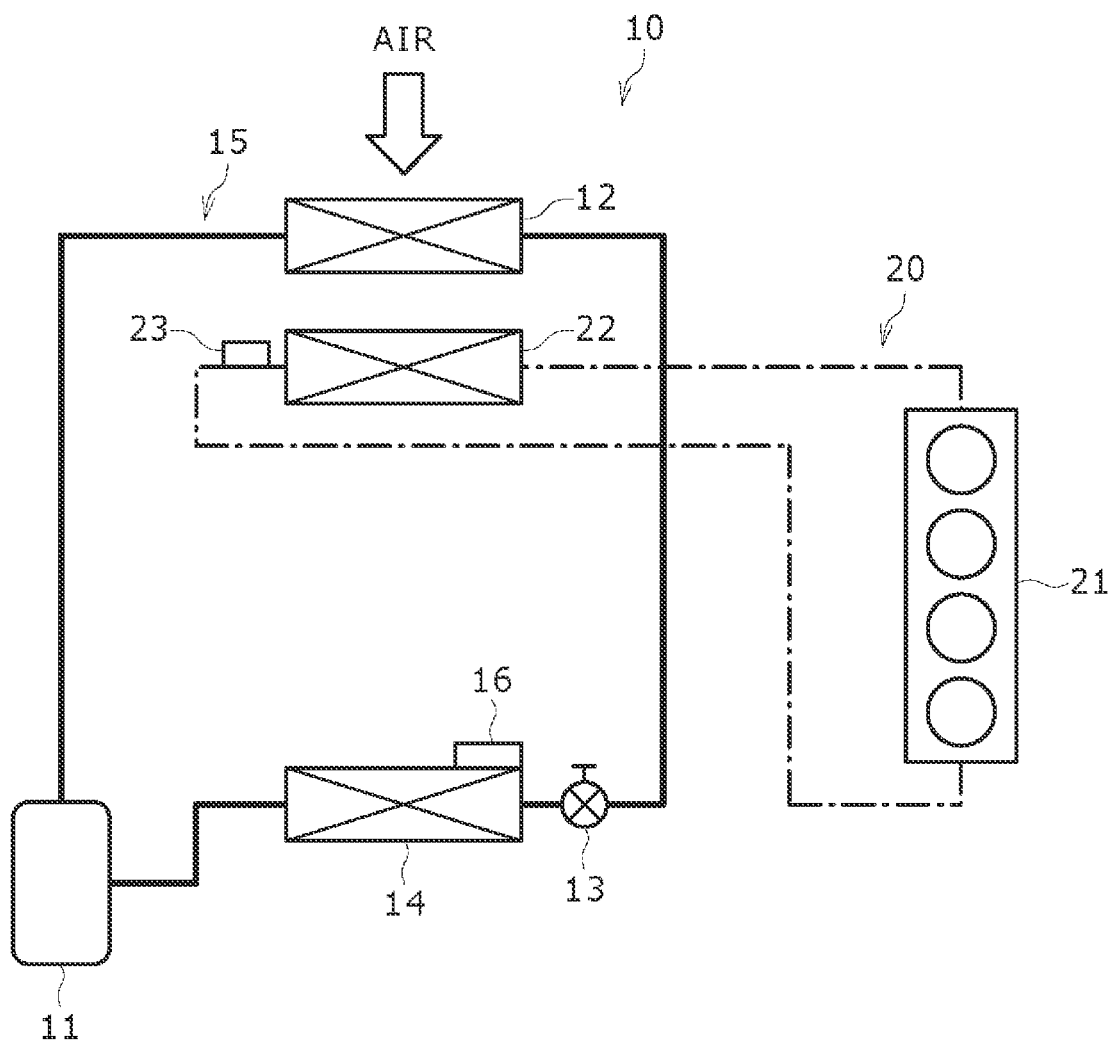
FIG. 2 is a circuit diagram showing a configuration of a vehicle air conditioning device that is an example of the embodiment.

As shown in FIG. 2, as described above, the vehicle air conditioning device 10 includes a vapor compression refrigeration cycle 15 that conditions the air in the vehicle cabin 6 and that is configured of a compressor 11, a condenser 12, an expansion valve 13, and an evaporator 14.

The condenser 12 dissipates heat by condensing a refrigerant, and is provided on the upstream side of the ventilation path of a radiator 22 described later (see FIG. 3). The evaporator 14 absorbs heat by evaporating the refrigerant and cools the air supplied into the vehicle cabin 6. An evaporator sensor 16 for detecting the evaporation temperature of the evaporator 14 is provided on the upstream side of the evaporator 14.

As shown in FIG. 2, as described above, the cooling device 20 has the radiator 22 that cools the engine 21 by circulating the coolant and that dissipates heat of the coolant. A coolant temperature sensor 23 for detecting the temperature of the coolant is provided on the upstream side of the radiator 22.

In this example, the object to be cooled by the cooling device 20 is the engine 21, but the cooling device 20 is not limited to this. For example, in the case of an electric vehicle, the object to be cooled may be a battery. Further, in the case of a fuel cell electric vehicle, the object to be cooled may be a fuel cell (FC) stack.

Figure 3:
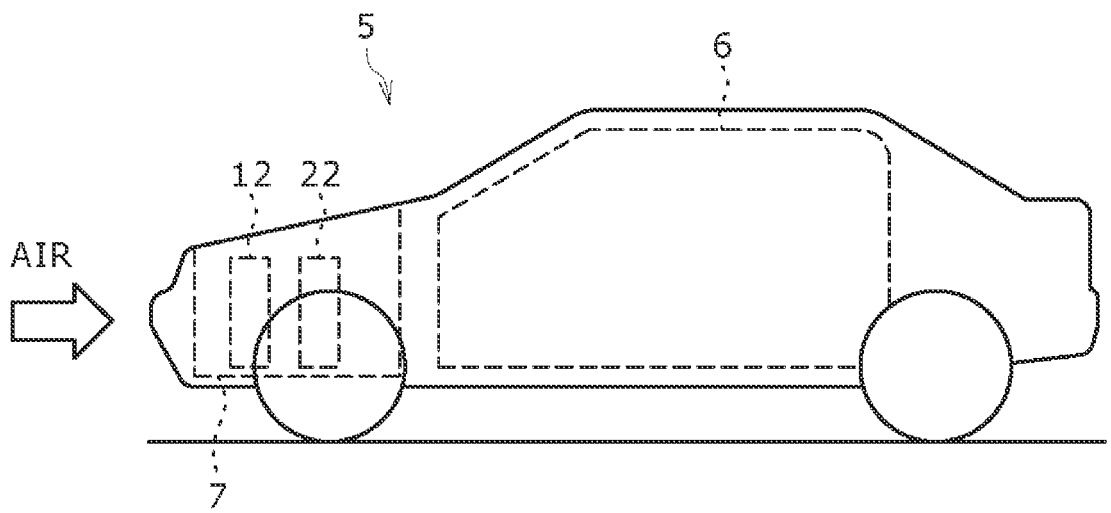
FIG. 3 is a diagram describing an arrangement of a condenser and a radiator.

As shown in FIG. 3, the radiator 22 is provided in an engine room 7 at the front part of the vehicle 5 and is cooled by the traveling wind of the vehicle 5 or the ventilation by the blower. The condenser 12 of the vehicle air conditioning device 10 is provided on the upstream side of the ventilation path of the radiator 22.

As described above, the condenser 12 of the vehicle air conditioning device 10 and the radiator 22 of the cooling device 20 are provided in the ventilation path formed by the traveling wind of the vehicle 5 or the ventilation by the blower, and the condenser 12 is provided on the upstream side of the radiator 22. As a result, when the condensing capacity of the condenser 12 decreases, the heat radiating capacity of the radiator 22 increases, and when the condensing capacity of the condenser 12 increases, the heat dissipation capacity of the radiator 22 decreases.

Figure 4:
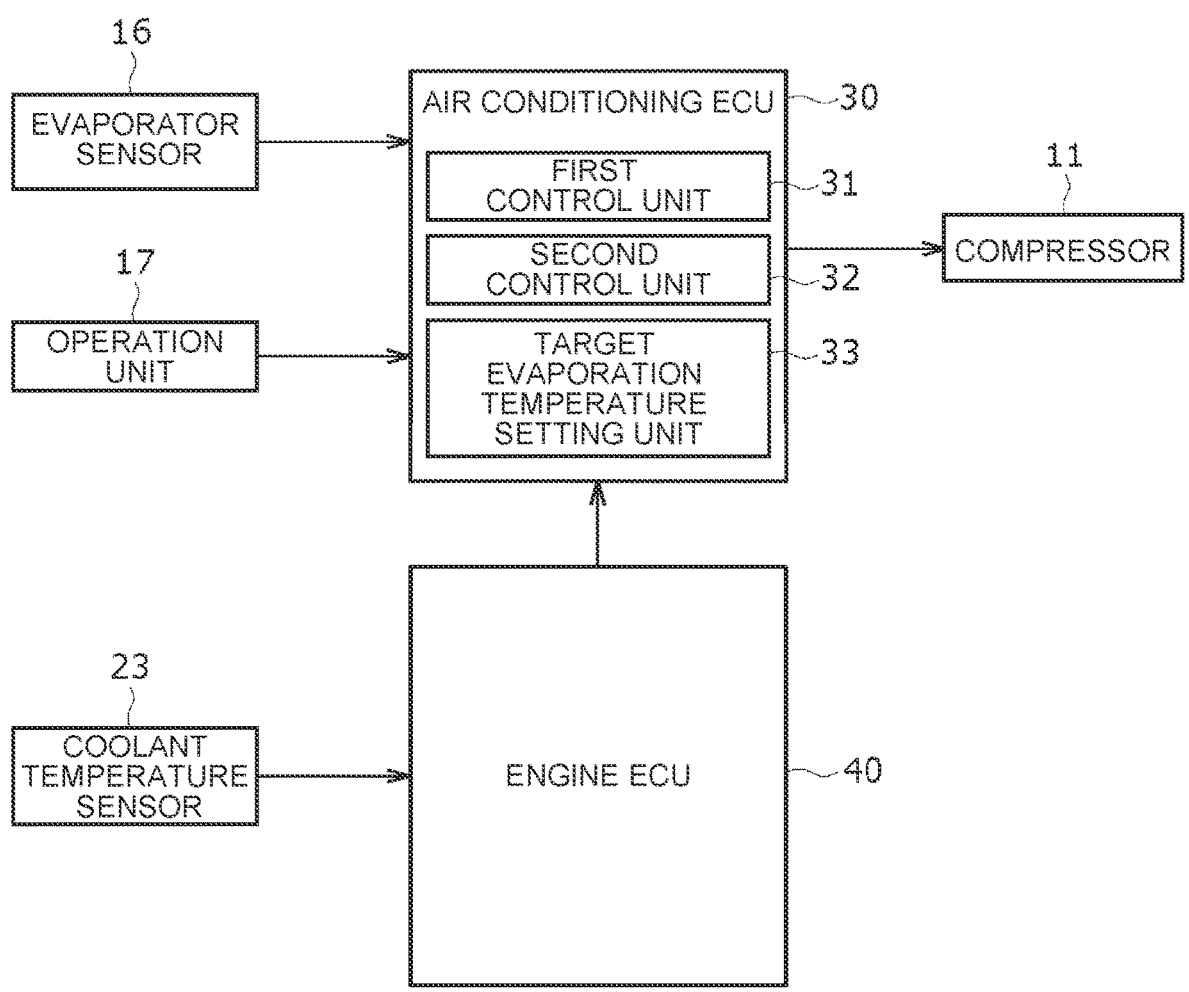
FIG. 4 is a block diagram showing a control configuration of the vehicle air conditioning device that is the example of the embodiment.

The air conditioner ECU 30 and the engine ECU 40 will be described with reference to FIG. 4.

As described above, the air conditioner ECU 30 controls the vehicle air conditioning device 10. According to the air conditioner ECU 30, although the details will be described later, it is possible to suppress the cooling capacity of the vehicle cabin 6 from decreasing when the control for increasing the target evaporation temperature is continuously executed. As a result, the comfortability of the vehicle cabin 6 is not impaired.

The air conditioner ECU 30 includes a central processing unit (CPU), and a storing unit such as a read-only memory (ROM) and a random access memory (RAM), and performs signal processing following a program stored beforehand in the ROM while using the temporary storage function of the RAM.

The air conditioner ECU 30 is connected to the engine ECU 40, the compressor 11, the evaporator sensor 16 and a operation unit 17, and a signal is transmitted from the engine ECU 40, the evaporator sensor 16 and the operation unit 17, and the signal is transmitted to the compressor 11.

The air conditioner ECU 30 sets a target evaporation temperature as a target evaporation temperature for evaporating the refrigerant in the evaporator 14. Further, the air conditioner ECU 30 detects the evaporation temperature of the evaporator 14 by the evaporator sensor 16 provided on the upstream side of the evaporator 14 in the vapor compression refrigeration cycle 15. Further, the air conditioner ECU 30 cools or heats the vehicle cabin 6 so as to reach the temperature set by the operation unit 17 provided in the vehicle cabin 6.

More specifically, the air conditioner ECU 30 sets the target evaporation temperature based on the set temperature transmitted from the operation unit 17, and transmits the signal to the compressor 11 to adjust the rotation speed of the compressor 11 so that the evaporation temperature transmitted from the evaporator sensor 16 becomes the target evaporation temperature.

The air conditioner ECU 30 includes a first control unit 31, a second control unit 32, and a target evaporation temperature setting unit 33. When the temperature of the coolant of the cooling device 20 is equal to or higher than the first predetermined temperature, the first control unit 31 sets the target evaporation temperature by increasing the target evaporation temperature by the predetermined temperature and sets the target evaporation temperature as the first target evaporation temperature, the second control unit 32 changes the target evaporation temperature in accordance with the cooling load in the vehicle cabin 6 to set the target evaporation temperature as the second target evaporation temperature, and the target evaporation temperature setting control unit 33 selects the first target evaporation temperature or the second target evaporation temperature to set it.

When the temperature of the coolant detected by the coolant temperature sensor 23 via the engine ECU 40 becomes the first predetermined temperature (for example, 120° C.) or higher, the first control unit 31 executes the first control of setting the target evaporation temperature by increasing the target evaporation temperature by the predetermined temperature.

As described above, the second control unit 32 executes the second control of changing the target evaporation temperature in accordance with the cooling load in the vehicle cabin 6. When the cooling load of the vehicle cabin 6 is lowered by, for example, the operation unit 17 raising the set temperature inside the vehicle cabin 6 or the operation unit 17 selecting the automatic mode (AUTO mode), the second control unit 32 sets the target evaporation temperature by raising the target outlet temperature that is the target temperature of the air supplied inside the vehicle cabin 6, and increases the target evaporation temperature so as to reach the set target outlet temperature.

When the second control is executed after the first control is executed, the target evaporation temperature setting unit 33 sets the first target evaporation temperature set by the first control as the target evaporation temperature, and calculates the second target evaporation temperature that is changed by the second control based on the target evaporation temperature immediately before the first control is executed, and when the second target evaporation temperature becomes larger than the first target evaporation temperature, the second target evaporation temperature is set as the target evaporation temperature.

Here, the second target evaporation temperature becomes larger than the first target evaporation temperature when the operation in which the cooling load inside the vehicle cabin 6 is reduced is performed as described above.

Further, the target evaporation temperature setting unit 33 executes the second control after executing the first control, and when the temperature of the coolant becomes the second predetermined temperature (for example, 115° C.) or less, the second target evaporation temperature is set as the target evaporation temperature. The second predetermined temperature is lower than the first predetermined temperature.

The engine ECU 40 detects the temperature of the coolant by the coolant temperature sensor 23 provided on the upstream side of the radiator 22 in the cooling device 20.

The flow of the target evaporation temperature setting control by the air conditioner ECU 30 and the time-series change of the target evaporation temperature by the target evaporation temperature setting control will be described with reference to FIGS. 5 and 6.

Figure 5:
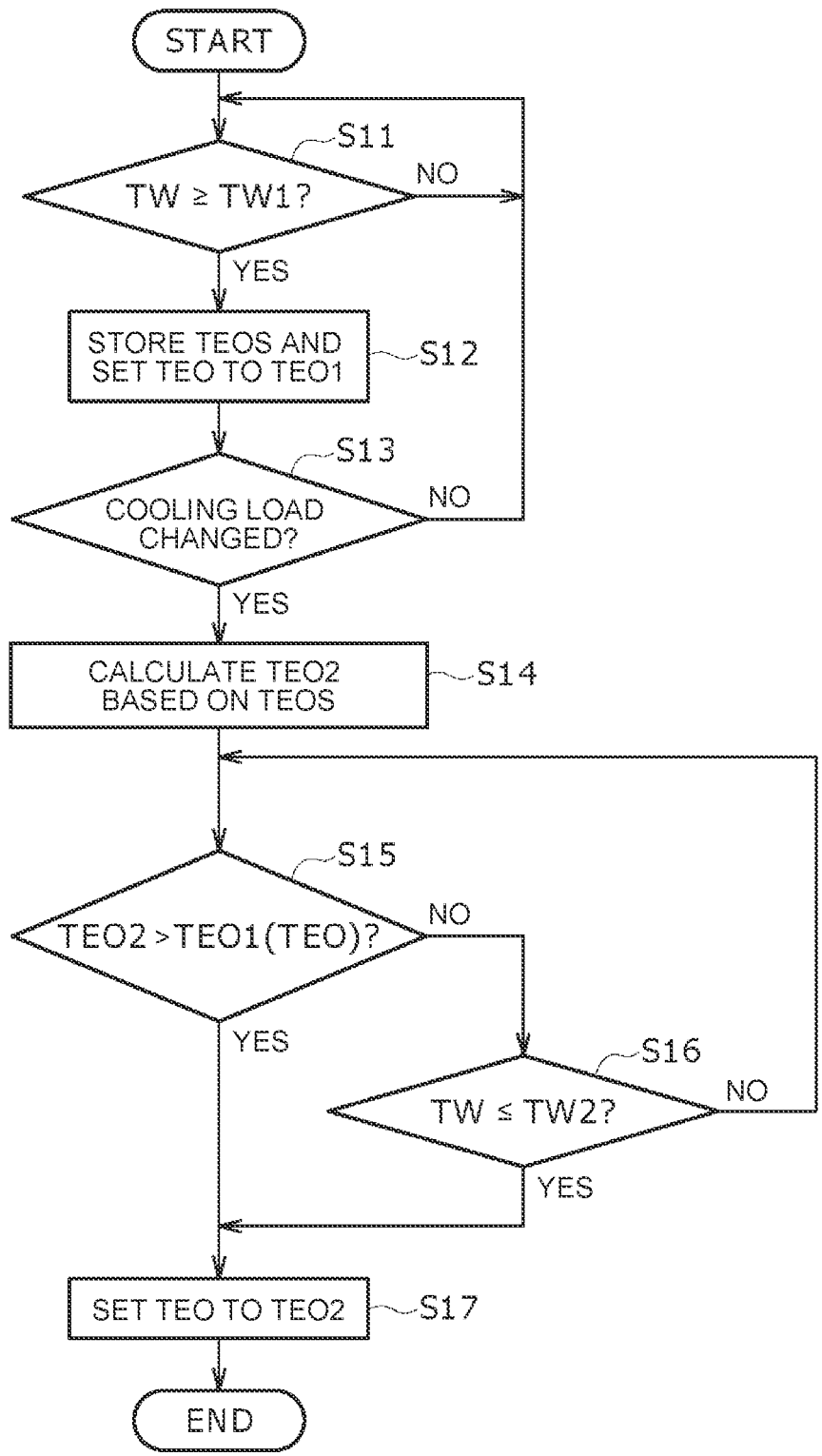
FIG. 5 is a flow showing a control of the vehicle air conditioning device that is the example of the embodiment.

As shown in FIG. 5, the target evaporation temperature setting control is a control for setting the target evaporation temperature (TEO) by the air conditioner ECU 30. In step S11, it is confirmed whether the coolant temperature (TW) of the cooling device 20 is equal to or higher than the first predetermined temperature (TW1). When the temperature of the coolant is equal to or higher than the first predetermined temperature (TW1), the process proceeds to step S12.

In step S12, the current target evaporation temperature is stored as the reference target evaporation temperature (TEOS), and the first target evaporation temperature (TEO1 in FIG. 5) raised by the predetermined temperature from the current target evaporation temperature is set as the target evaporation temperature (TEO).

In step S13, it is confirmed whether the operation unit 17 has performed an operation of changing the cooling load inside the vehicle cabin 6. When the operation for changing the cooling load is performed, the process proceeds to step S14. In step S14, the second target evaporation temperature (TEO2) is calculated in accordance with the cooling load lowered based on the reference target evaporation temperature in step S12.

In step S15, the second target evaporation temperature and the first target evaporation temperature are compared, and when the second target evaporation temperature is larger than the first target evaporation temperature, the process proceeds to step S17.

In step S16, it is confirmed whether the coolant temperature of the cooling device 20 is equal to or lower than the second predetermined temperature (TW2). When the temperature of the coolant is equal to or lower than the second predetermined temperature (TW2), the process proceeds to step S17.

In step S17, the second target evaporation temperature (TEO2) is set as the target evaporation temperature.

Figure 6:
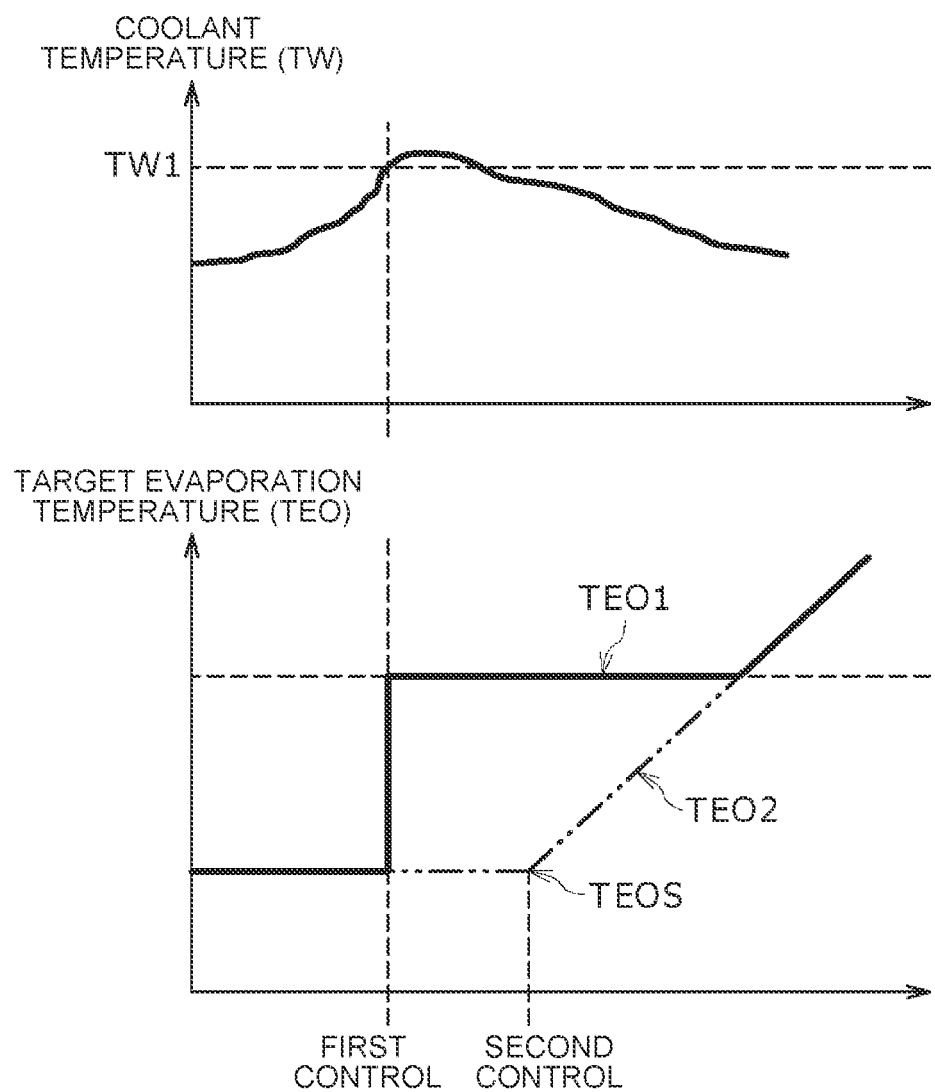
FIG. 6 is a graph showing a time-series change of a target evaporation temperature under the control of the vehicle air conditioning device that is the example of the embodiment.

As shown in FIG. 6, with the control by the air conditioner ECU 30 described above, when the second control is executed after the first control is executed, the first target evaporation temperature (TEO1) set by the first control is set as the target evaporation temperature (TEO), the second target evaporation temperature (TEO2: alternate long and two short dashes line in the figure) changed by the second control based on the reference target evaporation temperature (TEOS) immediately before the first control is executed is calculated, and when the second target evaporation temperature (TEO2) becomes larger than the first target evaporation temperature (TEO1), the second target evaporation temperature (TEO2) is set as the target evaporation temperature (TEO).

In other words, even when the second control is executed after the first control is executed, the first target evaporation temperature (TEO1) set by the first control is set as the target evaporation temperature (TEO), and is maintained until the second target evaporation temperature (TEO2) becomes larger than the first target evaporation temperature (TEO1).

As a result, even when the control for raising the target evaporation temperature is continuously executed, it is possible to suppress the cooling capacity inside the vehicle cabin 6 from being lowered without increasing the target evaporation temperature twice. As a result, the comfort inside the vehicle cabin 6 is not impaired.

Further, in accordance with the control by the air conditioner ECU 30 described above, when the second control is executed after the first control is executed and the coolant temperature (TW) becomes equal to or lower than the second predetermined temperature (TW2), the target evaporation temperature (TEO2) is set as the target evaporation temperature (TEO).

As a result, when it is not necessary to increase the heat dissipation capacity of the radiator 22, the first control is released in order to increase the condensation capacity of the condenser 12, and the cooling capacity inside the vehicle cabin 6 can be suppressed from decreasing. As a result, the comfort inside the vehicle cabin 6 is not impaired.

It should be noted that the present disclosure is not limited to the above-described embodiments and modifications thereof, and it goes without saying that various changes and improvements can be made within the scope of the matters described in the claims of the present application.

What is claimed is:

1. A vehicle air conditioning device including a condenser provided on an upstream side of a ventilation path of a radiator that dissipates heat of a coolant of an object to be cooled of a vehicle and an evaporator that cools air supplied inside a vehicle cabin, the vehicle air conditioning device comprising a control unit that sets a target evaporation temperature at which a refrigerant is evaporated in the evaporator, wherein when a temperature of the coolant is equal to or higher than a first predetermined temperature, the control unit executes a first control that sets the target evaporation temperature higher by a predetermined temperature and the control unit executes a second control that changes the target evaporation temperature in accordance with a cooling load inside the vehicle cabin, and wherein when the second control is executed after the first control is executed, a first target evaporation temperature set by the first control is set as the target evaporation temperature, and a second target evaporation temperature is calculated in which the second target evaporation temperature is changed by the second control based on the target evaporation temperature immediately before the first control is executed, and when the second target evaporation temperature becomes larger than the first target evaporation temperature, the second target evaporation temperature is set as the target evaporation temperature.

2. The vehicle air conditioning device according to claim 1, wherein when the second control is executed after the first control is executed, and when the temperature of the coolant becomes equal to or less than a second predetermined temperature, the second target evaporation temperature is set as the target evaporation temperature.

* * * * *